J. F. Hall.
Centre Board for Vessels.
No. 52,708. Patented Feb. 20, 1866.
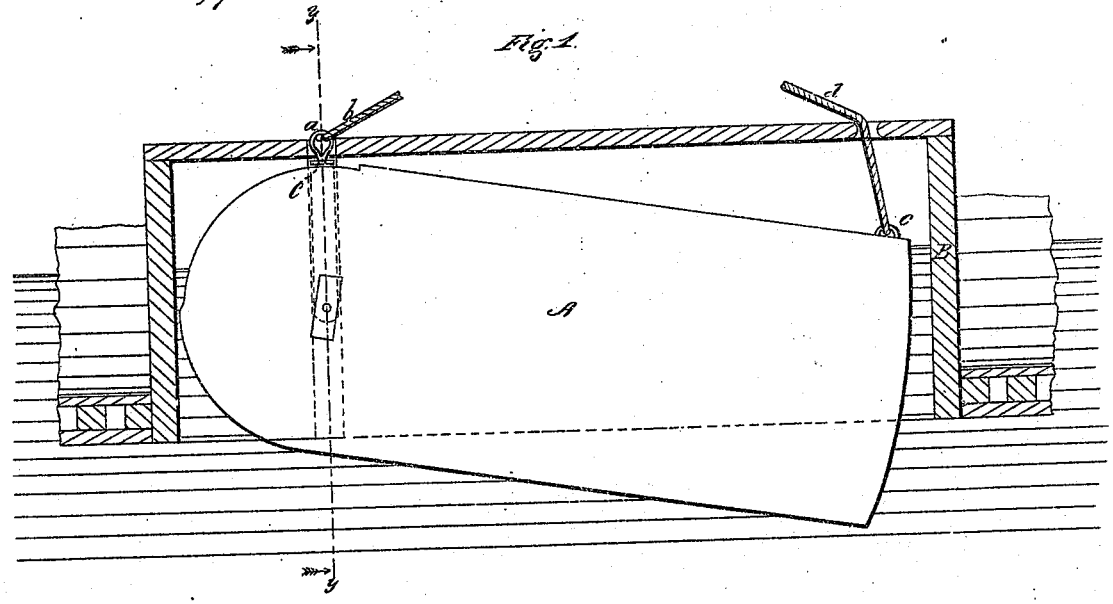
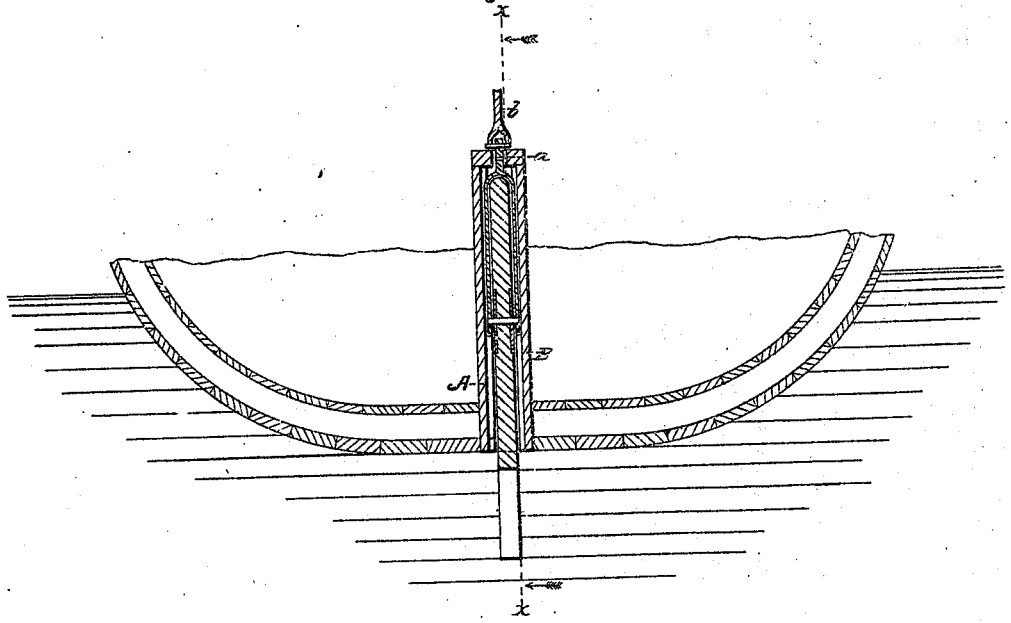
Witnesses:
Inventor:

UNITED STATES PATENT OFFICE.

J. F. HALL, OF WESTERLY, RHODE ISLAND.

IMPROVEMENT IN HANGING CENTER-BOARDS OF VESSELS.

Specification forming part of Letters Patent No. 52,708, dated February 20, 1866.

*To all whom it may concern:*

Be it known that I, J. F. HALL, of Westerly, in the county of Washington and State of Rhode Island, have invented a new and useful Improvement in Hanging Center-Boards of Vessels; and I do hereby declare that the following is a full, clear, and exact description thereof, which will enable others skilled in the art to make and use the same, reference being had to the accompanying drawings, forming part of this specification, in which—

Figure 1 represents a longitudinal vertical section of this invention, taken in the plane indicated by the line $x\,x$, Fig. 2. Fig. 2 is a transverse section of the same, the line $y\,y$, Fig. 1, indicating the plane of section.

Similar letters of reference indicate like parts.

This invention consists in the arrangement of a swivel-yoke, in combination with the center board of a vessel, in such a manner that said center-board can be lowered and raised parallel to the keel of the vessel, or that it can be lowered at one end in the usual manner; and that by these means a much greater surface of the center-board can be brought into action, whenever it may be desirable, than by the usual method of hanging the said center-boards.

A represents the center-board of a vessel, which is made of wood or any other suitable material, and which is inclosed in the open bottom chamber, B, in the usual manner.

Instead of hanging the center-board on a stationary pivot near its front edge, however, I secure the pivot in a yoke, C, which straddles the center-board, and which is provided with an eye, $a$, to receive the rope $b$. Another eye, $c$, in the top edge of the center-board near its rear edge, serves to take the rope $d$.

By this arrangement the center-board is free to swivel on its pivot in the ordinary manner, so that the rear end of the same can be raised or lowered while the front edge remains stationary, and at the same time, if it is desired to bring the largest possible surface of the center-board into action, the front end of the same can be lowered as well as the rear end, keeping the bottom edge of the board parallel with the keel of the vessel.

By the application of my swivel-yoke, therefore, I am enabled to give to the vessel more steadiness in rough water, and to run her in shallower water than it can be done with a center-board hung in the usual manner, and the additional cost is so small that it entirely disappears when compared with the great advantages derived from this invention.

What I claim as new, and desire to secure by Letters Patent, is—

The swivel yoke C, in combination with the center-board of a vessel, substantially as and for the purpose described.

The above specification of my invention signed by me this 3d day of January, 1866.

J. F. HALL.

Witnesses:
WM. DEAN OVERELL,
M. M. LIVINGSTON.